Patented Apr. 27, 1926.

1,582,802

UNITED STATES PATENT OFFICE.

ALBRECHT THIELE, OF BERLIN, GERMANY, ASSIGNOR TO CHEMISCHE FABRIK AUF ACTIEN (VORM. E. SCHERING), OF BERLIN, GERMANY.

MANUFACTURE OF A PHARMACEUTICAL PRODUCT.

No Drawing.   Application filed May 18, 1923.  Serial No. 639,975.

*To all whom it may concern:*

Be it known that I, ALBRECHT THIELE, citizen of Germany, residing at Berlin, Germany, have invented a new and useful Improvement in the Manufacture of a Pharmaceutical Product, of which the following is a specification.

The invention relates to the preparation of a new pharmaceutical product which is the reaction product of 4-dimethylamino-2.3-dimethyl-1-phenyl-5-pyrazolon and phenylethylbarbituric acid, and which may be formed by melting these two materials together. The product is of a yellow color, melts very gradually from about 106° to 120° centigrade and is soluble in water, especially when warmed, and in alcohol, ether and acetone. It is marked by valuable therapeutical properties, particularly by excellent analgesic effects.

The product which must be supposed to be an addition-compound, is prepared by melting together 4-dimethylamino-2.3-dimethyl-1-phenyl-5-pyrazolon with phenylethylbarbituric acid, suitably, to avoid decomposition at a temperature not exceeding about 125° centigrade. Thus two molecules of 4-dimethylamino-2.3-dimethyl-1-phenyl-5-pyrazolon and one molecule of phenylethylbarbituric acid are combined. It is desirable therefor, to melt together the two compounds in the above stated ratio, though the compounds may be otherwise combined if desired.

To perform the method of preparation one proceeds for instance as follows:

Two molecules of 4-dimethylamino-2.3-dimethyl-1-phenyl-5-pyrazolon are heated with one molecule of phenylethylbarbituric acid, while the mixture is being well stirred to a temperature of about 125° centigrade until the compounds have been melted to a yellow liquid. The melted mass is filtered off while hot and then is allowed to freeze.

I claim as my invention:

1. The reaction product of the combination of phenylethylbarbituric acid and 4-dimethylamino-2.3-dimethyl-1-phenyl-5-pyrazolon.

2. As a new article of manufacture a product consisting of two molecules of 4-dimethylamino-2.3-dimethyl-1-phenyl-5-pyrazolon and one molecule of phenylethylbarbituric acid, melting very gradually from about 106° to 120° centigrade, being soluble in water especially when warmed, in alcohol, ether and acetone, and possessing strong analgesic properties.

In testimony whereof I have hereunto set my signature.

DR. ALBRECHT THIELE.